US005842735A

United States Patent [19]

Makino et al.

[11] Patent Number: 5,842,735

[45] Date of Patent: Dec. 1, 1998

[54] DOOR HINGE FOR VEHICLE

[75] Inventors: Koji Makino, Susono; Junji Okumura, Takahama; Hiroki Nasuda, Ohbu, all of Japan

[73] Assignees: Toyota Jidosha Kabushiki Kaisha, Toyota; Aisin Seiki Kabushiki Kaisha, Kariya, both of Japan

[21] Appl. No.: 728,372

[22] Filed: Oct. 10, 1996

[30] Foreign Application Priority Data

Nov. 7, 1995 [JP] Japan .................................... 7-288598

[51] Int. Cl.[6] .................................. B60J 5/00; E05D 5/00

[52] U.S. Cl. ....................... 296/189; 296/146.11; 16/221; 16/387

[58] Field of Search .................................... 296/188, 189, 296/146.1, 146.11; 16/221, 387

[56] References Cited

U.S. PATENT DOCUMENTS

| | | | |
|---|---|---|---|
| 1,934,074 | 11/1933 | Kubler | 16/387 |
| 2,138,523 | 11/1938 | Haberstump | 296/146.11 |
| 4,662,115 | 5/1987 | Ohya et al. . | |
| 5,431,476 | 7/1995 | Torigaki | 296/189 |

FOREIGN PATENT DOCUMENTS

| | | | |
|---|---|---|---|
| 509690 | 10/1992 | European Pat. Off. . | |
| 4-81322 | 3/1992 | Japan . | |
| 162931 | 5/1921 | United Kingdom | 16/387 |
| 2144797 | 3/1985 | United Kingdom . | |

*Primary Examiner*—Dean Kramer
*Attorney, Agent, or Firm*—Pillsbury Madison & Sutro LLP

[57] ABSTRACT

A door hinge is provided for a side-door of a vehicle whereby an impact applied to the side door in a direction transverse to the vehicle is absorbed at a connecting portion for connecting the side door to the body of the vehicle. The door hinge is comprised of a female and a male, and a connecting portion is provided uprightly on the male. Bearing portions are provided uprightly on the female, and the connecting portion and the bearing portions rotate relatively to each other with a shaft as a center of rotation. The connecting portion of the male is curved in such a manner as to protrude in the forward direction of the vehicle, and a point of application of a load and a support point in the male are offset from each other in the longitudinal direction of the vehicle. In a case where an impact load is applied to the side door from its outer side in the transverse direction of the vehicle, the connecting portion of the male becomes further curved in such a manner as to protrude further in the forward direction of the vehicle.

4 Claims, 7 Drawing Sheets

DOOR HINGE FOR VEHICLE

BACKGROUND OF THE INVENTION

1. Field of the Invention

The present invention relates to a door hinge for a vehicle, and more particularly to a door hinge for a vehicle which is provided with an impact absorbing capability.

2. Description of the Related Art

A conventional door hinge for a vehicle is generally constructed as shown in FIG. 7 (Japanese Patent Application Laid-Open No. 4-81322), in which a male 106 of a hinge 104 is secured to a vehicle outer side wall portion 102A of an outer panel 102 of a pillar 100 by means of bolts 108 and nuts 110. Further, a female 112 of the hinge 104 is secured to a vehicle front side wall portion 116A of an inner panel 116 of a side door 114 by means of bolts 118 and nuts 120. The male 106 and the female 112 of the hinge 104 are pivotally supported by means of a shaft 122.

With such a door hinge 104 for a vehicle, however, in a case where an impact load is applied to the side door 114 from its outer side in the transverse direction of the vehicle (in the direction of arrow F in FIG. 7), a structure is not provided for absorbing the impact by the hinge 104 at its connecting portion for connecting the pillar 100 and the side door 114.

SUMMARY OF THE INVENTION

In view of the above-described circumstances, it is an object of the present invention to provide a door hinge for a vehicle whereby an impact applied to a side door of a vehicle in the transverse direction of the vehicle can be absorbed by the door hinge at its connecting portion for connecting a vehicle body and the door.

To this end, in accordance with a first aspect of the present invention, there is provided a door hinge for a vehicle for connecting a door to a vehicle body, comprising: an impact absorbing portion adapted to be deformed by an impact acting in a transverse direction of the vehicle so as to absorb the impact, the impact absorbing portion being provided at a connecting portion for connecting the vehicle body and the door.

Accordingly, if an impact is applied to the door in the transverse direction of the vehicle, the impact absorbing portion is deformed and absorbs the impact.

In accordance with a second aspect of the present invention, in the door hinge for a vehicle according to the first aspect of the invention, the door hinge is comprised of a hinge male and a hinge female, and the impact absorbing portion which is adapted to be deformed by the impact acting in the transverse direction of the vehicle so as to absorb the impact is provided on at least one of the hinge male and the hinge female.

Accordingly, if an impact is applied to the door in the transverse direction of the vehicle, the impact absorbing portion is deformed and absorbs the impact.

In accordance with a third aspect of the present invention, in the door hinge for a vehicle according to the second aspect of the invention, a point of application of a load and a support point of the impact absorbing portion are offset from each other, and the shape of a portion of the impact absorbing portion lying between the point of application of a load and the support point is curved in such a manner as to protrude in a direction away from the door.

Accordingly, if an impact is applied to the door in the transverse direction of the vehicle, the impact absorbing portion is deformed in a direction in which the impact absorbing portion does not interfere with the door, so as to absorb the impact.

In accordance with a fourth aspect of the present invention, in the door hinge for a vehicle according to the second aspect of the invention, the shape of the impact absorbing portion is curved in a vertical direction of the vehicle.

Accordingly, if an impact is applied to the door in the transverse direction of the vehicle, the impact absorbing portion becomes further curved in the vertical direction of the vehicle, and absorbs the impact.

In accordance with a fifth aspect of the present invention, in the door hinge for a vehicle according to the second aspect of the invention, the impact absorbing portion is constituted by a proximal portion, a hinge portion separated from the proximal portion, connecting means for connecting the hinge portion and the proximal portion, and a guide portion for guiding the connecting means during application of an impact and for relatively moving the hinge portion and the proximal portion in a direction in which the impact is absorbed.

Accordingly, if an impact is applied to the door in the transverse direction of the vehicle, the connecting means is guided by the guide portion, and the hinge portion and the proximal portion are relatively moved in the direction in the impact-absorbing direction, so as to absorb the impact.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Figure 1:
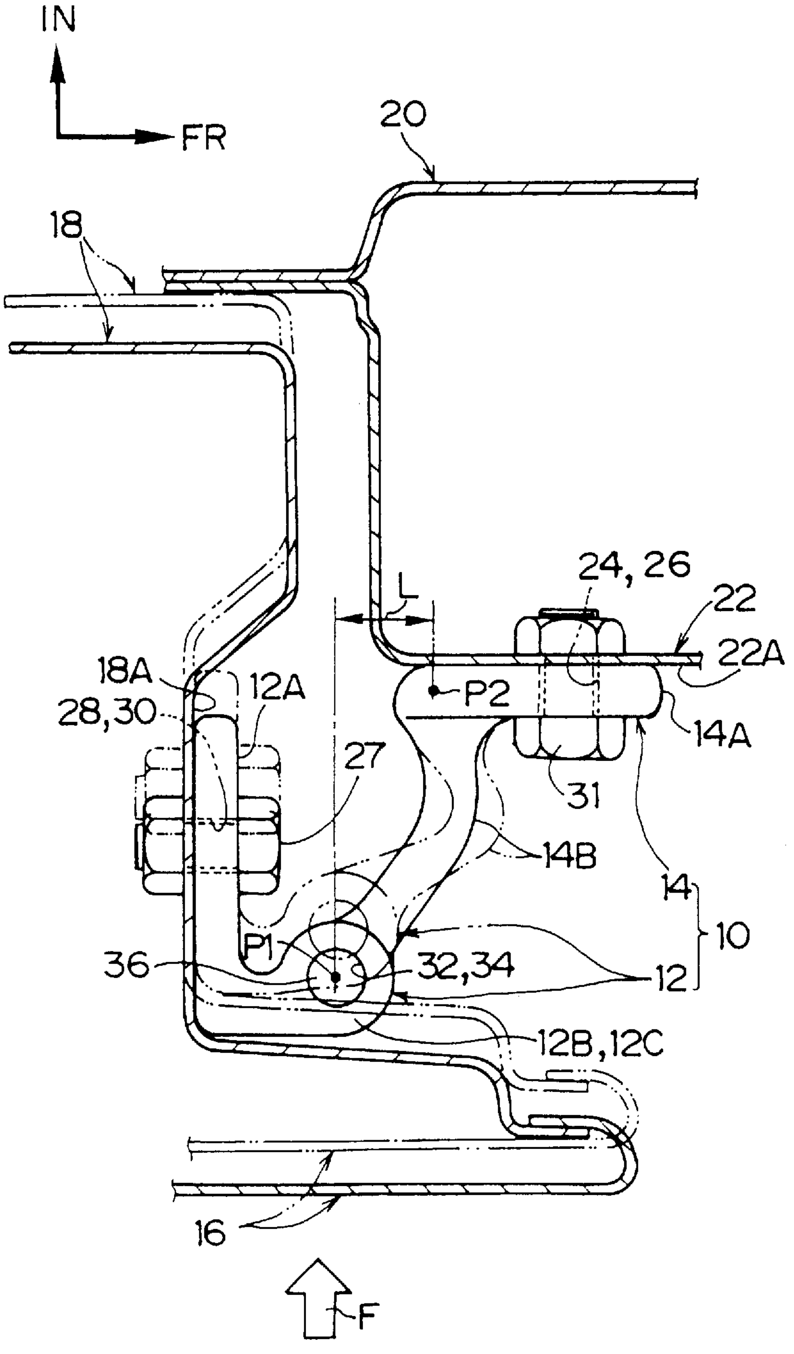
FIG. 1 is a horizontal cross-sectional view illustrating a door hinge for a vehicle in accordance with a first embodiment of the present invention.
Figure 2:
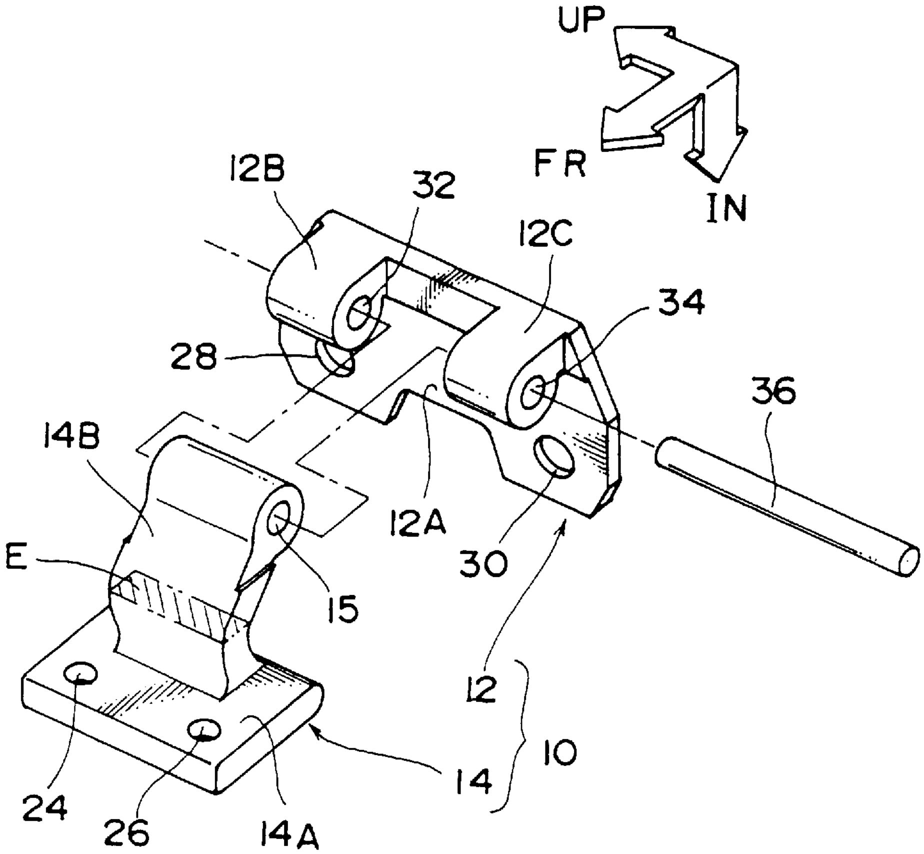
FIG. 2 is a perspective view illustrating the door hinge for a vehicle in accordance with the first embodiment of the present invention.

Referring to FIGS. 1 and 2, a description will be given of a first embodiment of a door hinge for a vehicle in accordance with the present invention. It should be noted that, in the drawings, arrow FR denotes a forward direction of the vehicle; arrow UP denotes an upward direction of the vehicle; and arrow IN denotes a transversely inward direction of the vehicle.

As shown in FIG. 1, a door hinge 10 for a vehicle in accordance with the first embodiment is comprised of a female 12 and a male 14. The female 12 is secured to a vehicle front side vertical wall portion 18A of a side door inner panel 18 which constitutes a vehicle compartment inner side portion of a side door 16. Meanwhile, the male 14 is secured to a vehicle outer side vertical wall portion 22A of a central pillar outer panel 22 which constitutes a vehicle outer side portion of a central pillar 20.

As shown in FIG. 2, a pair of attaching holes 24 and 26 are formed in an attaching portion 14A of the male 14 in a vertical row at a predetermined interval therebetween. As shown in FIG. 1, the male 14 is secured to the vehicle outer side vertical wall portion 22A of the central pillar outer panel 22 by means of bolts 31 inserted in the attaching holes 24 and 26. A connecting portion 14B serving as an impact absorbing portion is provided uprightly on the attaching portion 14A of the male 14. The cross-sectional shape of the connecting portion 14B is formed in a rectangular shape whose longitudinal direction is set as a vertical direction, as indicated by a hatched portion E in FIG. 2. A through hole 15 is formed at a distal end portion of the connecting portion 14B in such a manner as to extend in the vertical direction.

Meanwhile, a pair of attaching holes 28 and 30 are formed in an attaching portion 12A of the female 12 in a vertical row at a predetermined interval therebetween. As shown in FIG. 1, the female 12 is secured to the vehicle front side vertical wall portion 18A of the side door inner panel 18 by means of bolts 27 inserted in the attaching holes 28 and 30. A vertical pair of bearing portions 12B and 12C are provided uprightly on the attaching portion 12A of the female 12. Through holes 32 and 34 are respectively formed in the bearing portions 12B and 12C in such a manner as to extend in the vertical direction.

A shaft 36 is inserted in the through hole 15 of the male 14 and the through holes 32 and 34 of the female 12. The arrangement provided is such that the male 14 and the female 12 rotate relative to each other with this shaft 36 as a center of rotation, so as to open or close the side door 16.

As shown in FIG. 1, the center of the through hole 15 of the connecting portion 14B serves as a point P1 of application of a load, while a basal portion of the connecting portion 14B serves as a support point P2. The point P1 of application of a load and the support point P2 are offset from each other (with an offset amount L) in the longitudinal direction of the vehicle, and a portion of the connecting portion 14B lying between the point P1 of application of a load and the support point P2 is curved in a direction away from the vehicle front side vertical wall portion 18A of the side door inner panel 18, i.e., in such a manner as to protrude toward the front side of the vehicle.

Accordingly, in the event that an impact load is applied to the side door 16 from its outer side in the transverse direction of the vehicle (in the direction of arrow F in FIG. 1), the connecting portion 14B of the male 14 is pressed and becomes further curved in such a manner as to protrude further in the forward direction of the vehicle, as shown by the phantom lines in FIG. 1.

Next, a description will be given of the operation of the first embodiment.

With the door hinge 10 for a vehicle in accordance with the first embodiment, in a case where an impact load is applied to the side door 16 from its outer side in the transverse direction of the vehicle (in the direction of arrow F in FIG. 1), the connecting portion 14B of the male 14 is pressed and becomes further curved in such a manner as to protrude further in the forward direction of the vehicle, as shown by the phantom lines in FIG. 1. Consequently, the side door 16 moves toward the inner side in the transverse direction of the vehicle, and assumes the position indicated by the phantom lines in FIG. 1.

In the above-described manner, with the door hinge 10 for a vehicle in accordance with the first embodiment, in a case where an impact load is applied to the side door 16 from its outer side in the transverse direction of the vehicle, the connecting portion 14B of the male 14 is deformed in a direction in which the connecting portion 14B does not interfere with the vehicle front side vertical wall portion 18A of the side door inner panel 18. Hence, the impact can be absorbed reliably by this deformation.

Next, referring to FIGS. 3 and 4, a description will be given of a second embodiment of the door hinge for a vehicle in accordance with the present invention. Incidentally, the same component parts as those of the first embodiment will be denoted by the same reference numerals, and a description thereof will be omitted.

Figure 3:
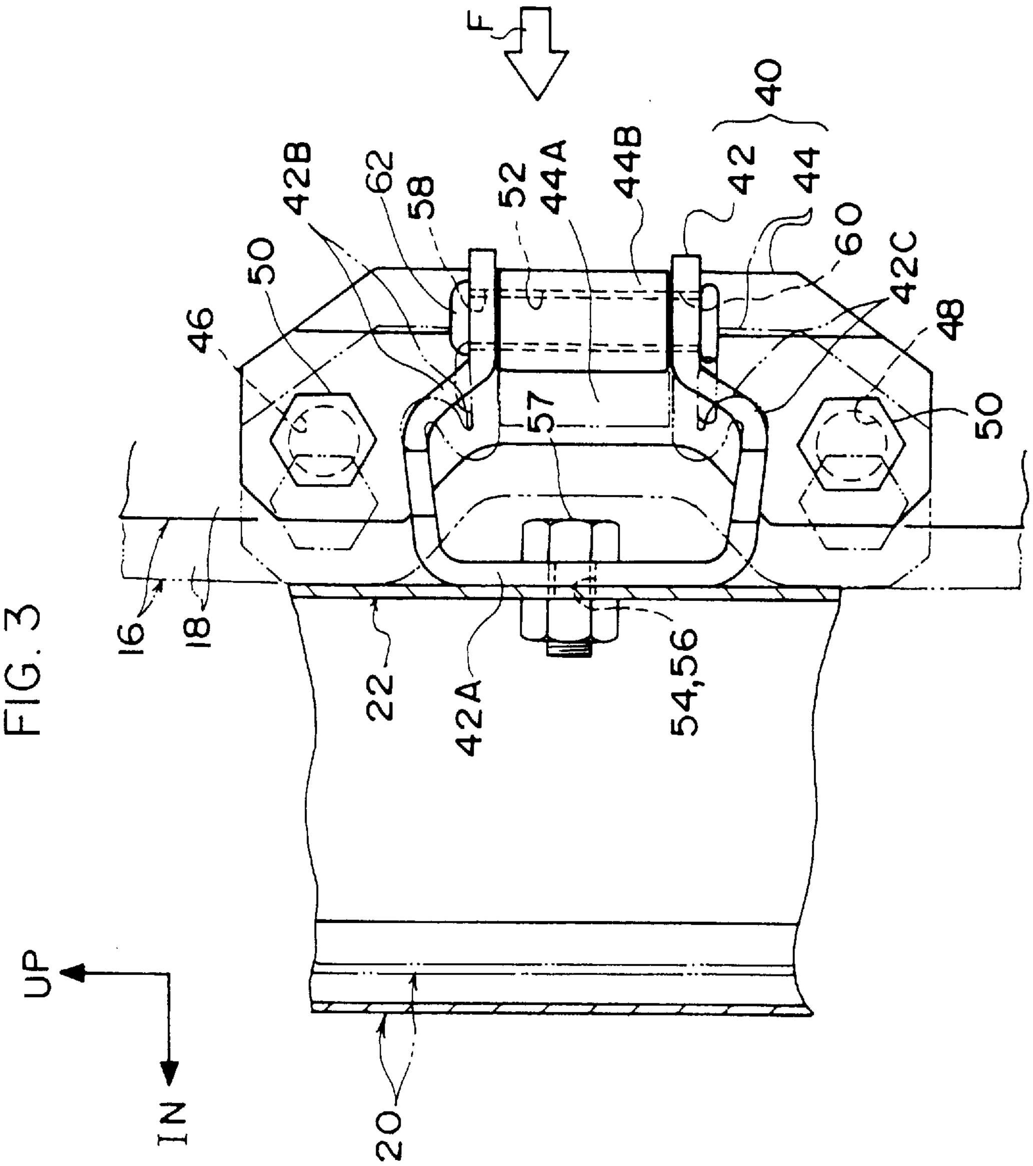
FIG. 3 is a side cross-sectional view illustrating a door hinge for a vehicle in accordance with a second embodiment of the present invention.

As shown in FIG. 3, a door hinge 40 for a vehicle in accordance with the second embodiment is comprised of a female 42 and a male 44. A pair of attaching holes 46 and 48 are formed in an attaching portion 44A of the male 44 in a vertical row at a predetermined interval therebetween. The male 44 is secured to the side door inner panel 18 by means of bolts 50 inserted in the attaching holes 46 and 48. Further, a bearing portion 44B is provided uprightly on the attaching portion 44A of the male 44, and a through hole 52 is formed in the bearing portion 44B in such a manner as to extend in the vertical direction.

Figure 4:
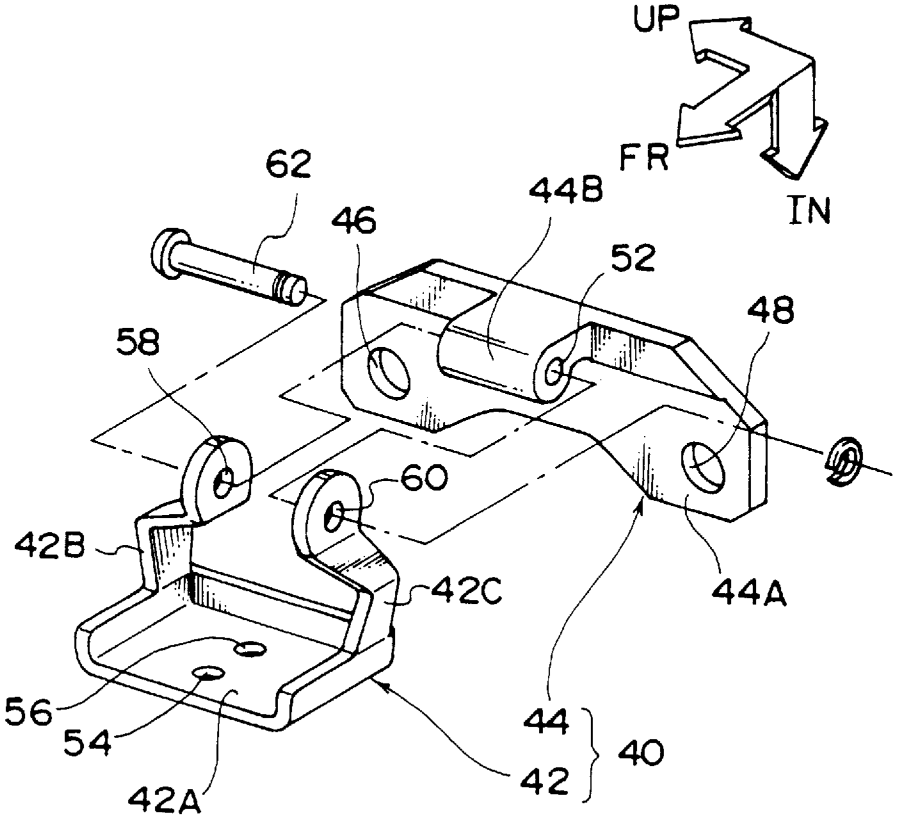
FIG. 4 is a perspective view illustrating the door hinge for a vehicle in accordance with the second embodiment of the present invention.

As shown in FIG. 4, a pair of attaching holes 54 and 56 are formed in an attaching portion 42A of the female 42 at a predetermined interval therebetween in the longitudinal direction of the vehicle. As shown in FIG. 3, the female 42 is secured to the central pillar outer panel 22 by means of bolts 57 inserted in the attaching holes 54 and 56. A vertical pair of connecting portions 42B and 42C serving as impact absorbing portions are provided uprightly on the attaching portion 42A of the female 42. Through holes 58 and 60 are respectively formed at distal end portions of the connecting portions 42B and 42C.

A shaft 62 is inserted in the through hole 52 of the male 44 and the through holes 58 and 60 of the female 42. The arrangement provided is such that the male 44 and the female 42 rotate relative to each other with this shaft 62 as a center of rotation, so as to open or close the side door 16.

As shown in FIG. 3, the connecting portion 42B of the female 42 is inclined in a diagonally downward direction of the vehicle from an intermediate portion thereof toward a distal end portion thereof (on the right-hand side in FIG. 3). On the other hand, the connecting portion 42C of the female 42 is inclined in a diagonally upward direction of the vehicle from an intermediate portion thereof toward a distal end portion thereof (on the right-hand side in FIG. 3).

Accordingly, in the event that an impact load is applied to the side door 16 from its outer side in the transverse direction of the vehicle (in the direction of arrow F in FIG. 3), the connecting portions 42B and 42C of the female 42 are bent in such a manner as to protrude toward the outer side of the vehicle, as shown by the phantom lines in FIG. 3.

Next, a description will be given of the operation of the second embodiment.

With the door hinge 40 for a vehicle in accordance with the second embodiment, in a case where an impact load is applied to the side door 16 from its outer side in the transverse direction of the vehicle (in the direction of arrow F in FIG. 3), the connecting portions 42B and 42C of the female 42 are bent in such a manner as to protrude toward the outer side of the vehicle, as shown by the phantom lines in FIG. 3. Consequently, the side door 16 moves toward the inner side in the transverse direction of the vehicle, and assumes the position indicated by the phantom lines in FIG. 3.

In the above-described manner, with the door hinge 40 for a vehicle in accordance with the second embodiment, in a case where an impact load is applied to the side door 16 from its outer side in the transverse direction of the vehicle, the connecting portions 42B and 42C of the female 42 are deformed in a direction in which the connecting portions 42B and 42C do not interfere with the side door inner panel 18. Hence, the impact can be absorbed reliably by this deformation.

Next, referring to FIGS. 5 and 6, a description will be given of a third embodiment of the door hinge for a vehicle in accordance with the present invention. Incidentally, the same component parts as those of the first embodiment will be denoted by the same reference numerals, and a description thereof will be omitted.

Figure 5:
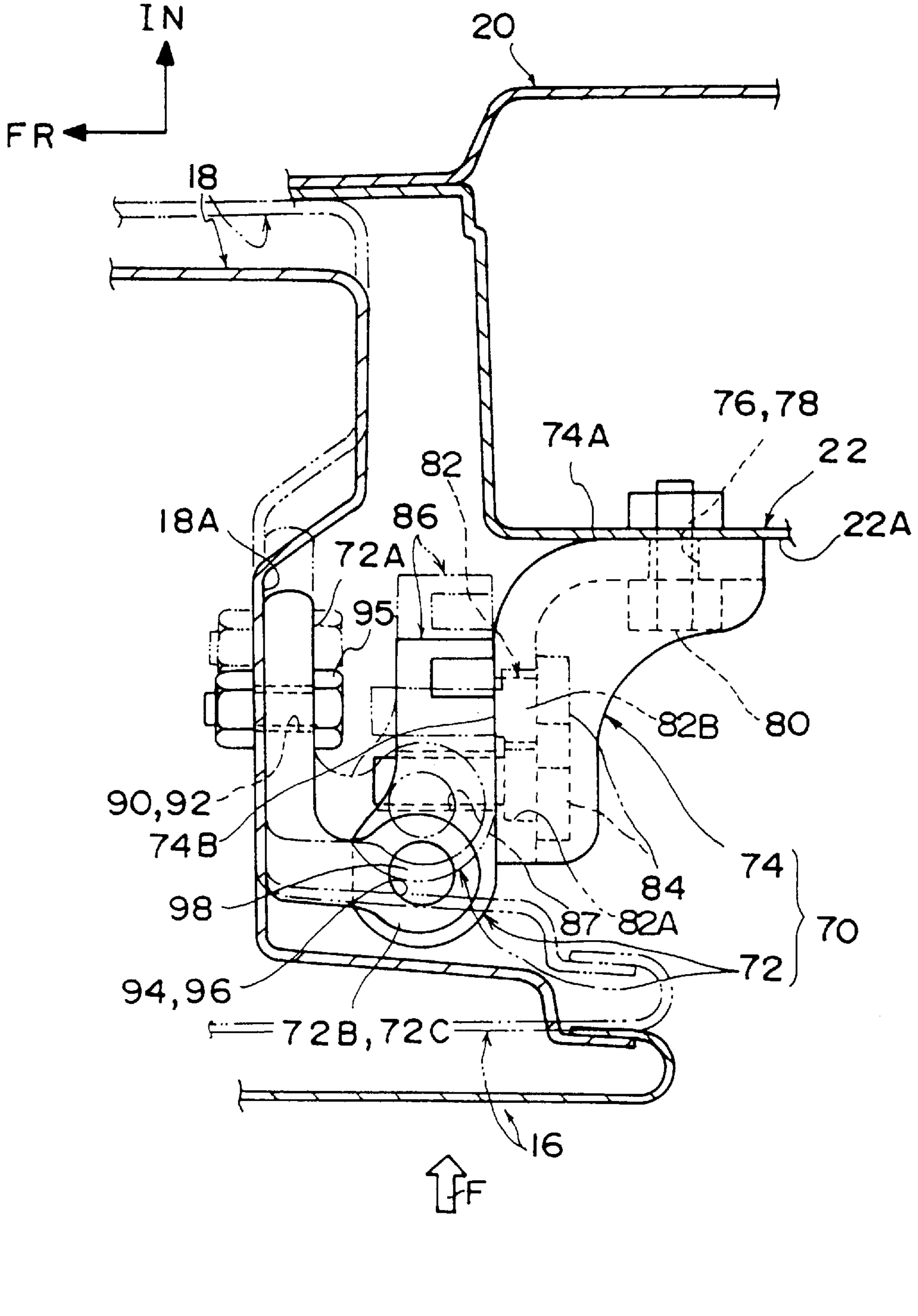
FIG. 5 is a horizontal cross-sectional view illustrating a door hinge for a vehicle in accordance with a third embodiment of the present invention.

As shown in FIG. 5, a door hinge 70 for a vehicle in accordance with the third embodiment is comprised of a female 72 and a male 74. A pair of attaching holes 76 and 78 are formed in an attaching portion 74A of the male 74 in a vertical row at a predetermined interval therebetween. The male 74 is secured to the vehicle outer side vertical wall portion 22A of the central pillar outer panel 22 by means of bolts 80 inserted in the attaching holes 76 and 78.

Figure 6:
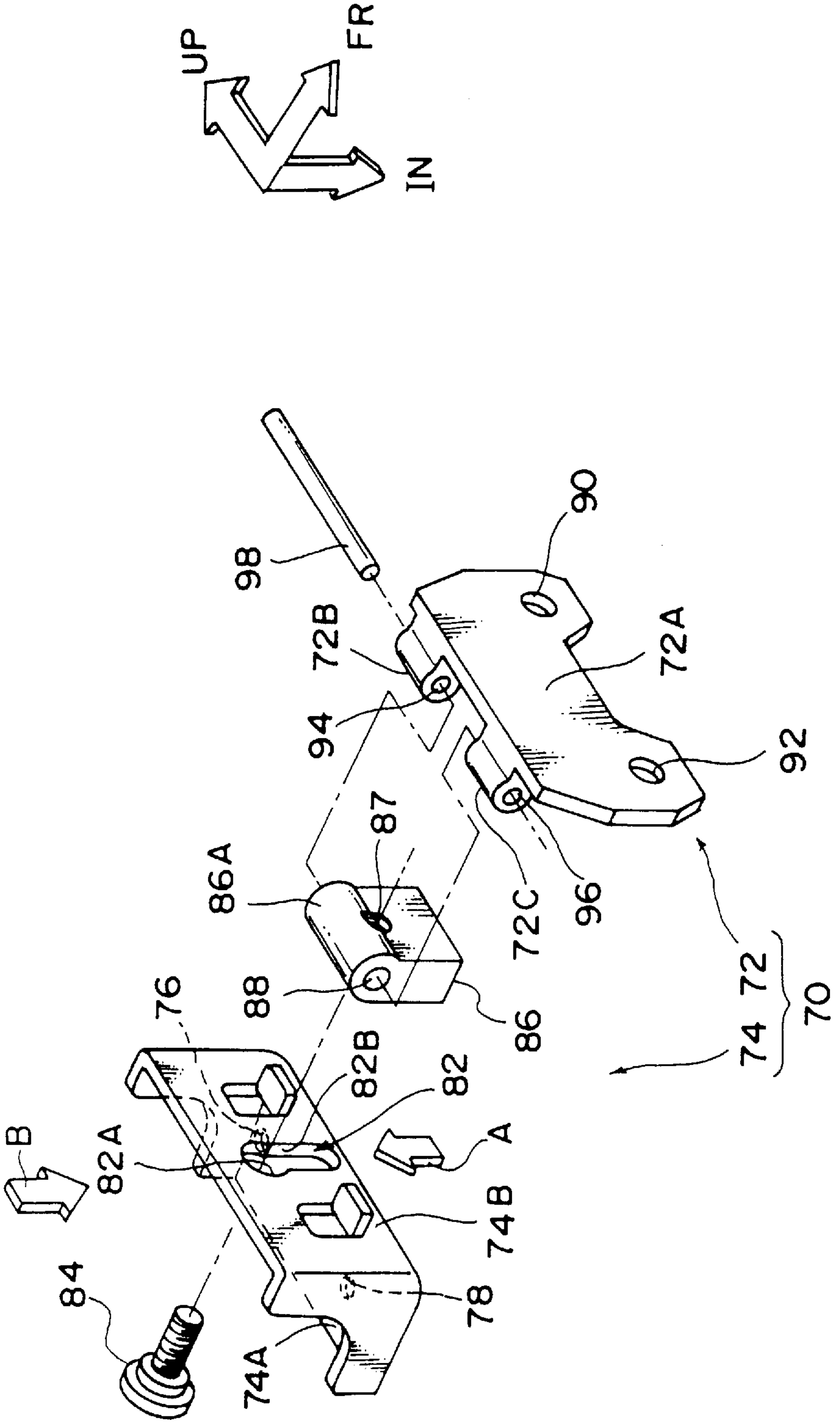
FIG. 6 is a perspective view illustrating the door hinge for a vehicle in accordance with the third embodiment of the present invention.
Figure 7:
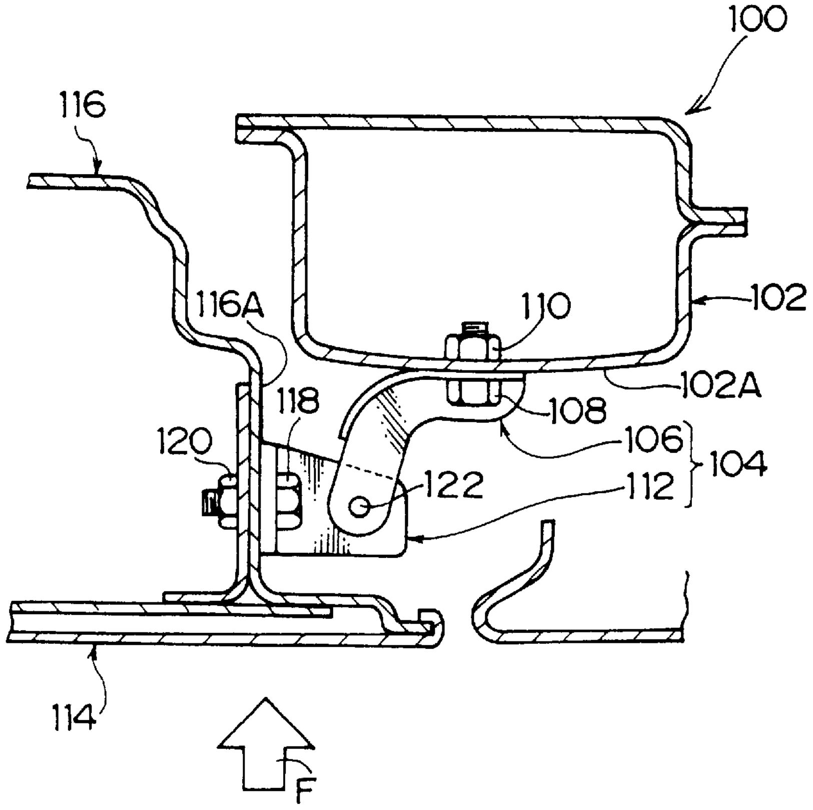
FIG. 7 PRIOR ART
FIG. 7 is a horizontal cross-sectional view illustrating a central pillar and a door hinge in accordance with the conventional art.

As shown in FIG. 6, a proximal portion 74B serving as a part of the impact absorbing portion is provided uprightly on the attaching portion 74A of the male 74, and an elongated hole 82 serving as a guide portion extending in the transverse direction of the vehicle is formed in a central portion of the proximal portion 74B. An outer side, as viewed in the transverse direction of the vehicle, of the elongated hole 82 serves as a bolt attaching portion 82A, while an inner side, as viewed in the transverse direction of the vehicle, of the elongated hole 82 serves as a narrow guide slit 82B.

A stepped screw 84 serving as a connecting means is inserted in the bolt attaching portion 82A of the elongated hole 82, and the stepped screw 84 is threadedly engaged in a threaded hole 87 formed in a hinge portion 86. It should be noted that the hinge portion 86 is formed separately from the male 74, and together with the proximal portion 74B constitutes an impact absorbing portion.

Accordingly, the arrangement provided is such that in a case where a load of a predetermined value or more is applied to the male 74 and the hinge portion 86 in the transverse direction of the vehicle (in the directions arrows A and B in FIG. 6), the stepped screw 84 and the guide slit 82B move relative to each other, so that the male 74 and the hinge portion 86 move relative to each other in the transverse direction of the vehicle.

In addition, a through hole 88 is formed in a distal end portion 86A of the hinge portion 86 in such a manner as to extend in the vertical direction.

Meanwhile, a pair of attaching holes 90 and 92 are formed in an attaching portion 72A of the female 72 in a vertical row at a predetermined interval therebetween. The female 72 is secured to the vehicle front side vertical wall portion 18A of the side door inner panel 18 by means of bolts 95 inserted in the attaching holes 90 an 92, as shown in FIG. 5.

Further, a vertical pair of bearing portions 72B and 72C are provided uprightly on the attaching portion 72A of the female 72, and through holes 94 and 96 are respectively formed on the bearing portions 72B and 72C in such a manner as to extend in the vertical direction.

A shaft 98 is inserted in the through hole 88 of the hinge portion 86 of the male 74 and the through holes 94 and 96 of the bearing portions 72B and 72C of the female 72, and the male 74 and the female 72 rotate relative to each other with the shaft 98 as a center of rotation, so as to open or close the side door 16.

Next, a description will be given of the operation of the third embodiment.

With the door hinge 70 for a vehicle in accordance with the third embodiment, in a case where an impact load is applied to the side door 16 from its outer side in the transverse direction of the vehicle (in the direction of arrow F in FIG. 5), the stepped screw 84 and the guide slit 82B move relative to each other, so that the male 74 and the hinge portion 86 move relative to each other in the transverse direction of the vehicle. Consequently, the side door 16 moves toward the inner side in the transverse direction of the vehicle, and assumes the position indicated by the phantom lines in FIG. 5.

In the above-described manner, with the door hinge 70 for a vehicle in accordance with the third embodiment, in a case where an impact load is applied to the side door 16 from its outer side in the transverse direction of the vehicle, stepped screw 84 and the guide slit 82B move relative to each other. Hence, the impact can be absorbed reliably by this movement.

Although, in the above description, specific embodiments of the present invention have been described in detail, the present invention is not limited to such embodiments, and it is apparent to those skilled in the art that various other embodiments are possible within the scope of the present invention. For example, an arrangement may be provided such that at least one of a male attaching portion for attaching a hinge male and a female attaching portion for attaching a hinge female is provided with an impact absorbing portion whereby at least one of the relative positions of the male attaching portion and the hinge male and the relative positions of the female attaching portion and the hinge female is changed due to an impact acting in the transverse direction of the vehicle, so as to absorb the impact.

What is claimed is:

1. A door hinge for a vehicle for connecting a door to a vehicle body, comprising:

an impact absorbing portion adapted to be deformed by an impact acting in a transverse direction of the vehicle so as to absorb the impact, said impact absorbing portion being provided at a connecting portion for connecting the vehicle body and the door, wherein said door hinge comprises a hinge male and a hinge female, and said impact absorbing portion is provided on at least one of said hinge male and said hinge female, and wherein one of said hinge male and said hinge female is secured to a vehicle outer side vertical wall portion of a central pillar outer panel which constitutes a vehicle outer side portion of a central pillar, while the other of said hinge male and said hinge female is secured to a vehicle front side vertical wall portion of a side door inner panel which constitutes a vehicle compartment inner side portion of a side door.

2. A door hinge for a vehicle for connecting a door to a vehicle body, comprising:

a hinge male and a hinge female; and an impact absorbing portion adapted to be deformed by an impact acting in a transverse direction of the vehicle so as to absorb the impact, said impact absorbing portion being provided on a least one of said hinge male and said hinge female wherein a point of application of a load and a support point of said impact absorbing portion are offset from each other, and the shape of a portion of said impact absorbing portion lying between the point of application of a load and the support point is curved in such a manner as to protrude in a substantially transverse direction of the impact away from the door when deformed by the impact, wherein one of said hinge male and said hinge female is secured to a vehicle outer side vertical wall portion of a central pillar outer panel which constitutes a vehicle outer side portion of a central pillar, while another one of said hinge male and said hinge female is secured to a vehicle front side vertical wall portion of a side door inner panel which constitutes a vehicle compartment inner side portion of a side door.

3. A door hinge for a vehicle according to claim 1, wherein the shape of said impact absorbing portion is curved in a vertical direction of the vehicle.

4. A door hinge for a vehicle according to claim 3, wherein said impact absorbing portion is constituted by a pair of connecting portions which are provided on said hinge female in a vertical row for connecting to said hinge male, the shapes of said connecting portions being curved in the vertical direction of the vehicle.

* * * * *